(12) United States Patent
Vitali (10) Patent No.: US 8,075,051 B2
(45) Date of Patent: Dec. 13, 2011

(54) ACTIVE HEADREST DEVICE FOR A VEHICLE

(75) Inventor: Roberto Vitali, Pesaro (IT)

(73) Assignee: I.F.T. S.p.A., Montelabbate (PU) (IT)

( * ) Notice: Subject to any disclaimer, the term of this patent is extended or adjusted under 35 U.S.C. 154(b) by 206 days.

(21) Appl. No.: 12/521,041

(22) PCT Filed: Dec. 28, 2007

(86) PCT No.: PCT/IB2007/004141
§ 371 (c)(1),
(2), (4) Date: Jun. 24, 2009

(87) PCT Pub. No.: WO2008/081317
PCT Pub. Date: Jul. 10, 2008

(65) Prior Publication Data
US 2010/0109396 A1    May 6, 2010

(30) Foreign Application Priority Data
Dec. 29, 2006   (IT) .............................. BO2006A0895

(51) Int. Cl.
*B60N 2/42* (2006.01)
*B60N 2/427* (2006.01)
*B60N 2/48* (2006.01)
*B60R 21/00* (2006.01)
*B60R 21/055* (2006.01)
(52) U.S. Cl. ................................................. 297/216.12
(58) Field of Classification Search .............. 297/216.12
See application file for complete search history.

(56) References Cited

U.S. PATENT DOCUMENTS
6,199,900 B1 * 3/2001 Zeigler ................ 297/216.12 X
(Continued)

FOREIGN PATENT DOCUMENTS
DE        19739131 C1    12/1998
(Continued)

OTHER PUBLICATIONS
International Search Report.

*Primary Examiner* — Rodney B White
(74) *Attorney, Agent, or Firm* — William J. Sapone; Coleman Sudol Sapone P.C.

(57) ABSTRACT

An active headrest device, for a vehicle, provided with at least a headrest portion (2) supported, through rotation means (3), by at least a support member (4) in order to allow the headrest portion (2) to swing between an extreme front and an extreme back position in respect to the vehicle. The device (1) comprises at least a pushing means (5) associated to at least a first elastic means (6) and which may be blocked or released by at least a swinging blocking arm (7) connected to at least an inertial mass (8); in an active condition (A), the blocking arm (7) blocks the pushing means (5) in a retracted condition allowing the headrest portion (2) to swing between the extreme front and extreme back positions, and in which the first elastic means (6) transmits to the pushing means (5) an elastic force directed in the direction of the extreme front position of the headrest portion (2), the inertial mass (8), in case of a stress bigger than a predefined threshold in a front or back direction, causes the rotation of the blocking arm (7) which releases the pushing means (5) which, as a result of the elastic force of the first elastic means (6), rotates and/or stops the headrest portion (2) in the extreme front position.

20 Claims, 13 Drawing Sheets

U.S. PATENT DOCUMENTS

| | | | |
|---|---|---|---|
| 6,213,548 B1 * | 4/2001 | Van Wynsberghe et al. | 297/216.12 |
| 6,761,403 B2 * | 7/2004 | Pal et al. | 297/216.12 |
| 7,448,678 B2 * | 11/2008 | Browne et al. | 297/216.12 |
| 7,556,313 B2 * | 7/2009 | Browne et al. | 297/216.12 |
| 2001/0040396 A1 * | 11/2001 | Kreuels et al. | 297/216.12 |
| 2007/0246989 A1 * | 10/2007 | Brockman | 297/216.12 X |

FOREIGN PATENT DOCUMENTS

| | | |
|---|---|---|
| DE | 102004059237 B3 | 2/2006 |
| EP | 1375244 A | 1/2004 |

\* cited by examiner

ACTIVE HEADREST DEVICE FOR A VEHICLE

TECHNICAL FIELD

The present invention refers to the support or sitting means for people and in particular it refers to an active headrest device to be used in a vehicle, fit to modify its position in consequence to a predefined stress, suitable for vehicle seats or chair.

BACKGROUND ART

There are known headrest for seat back of cars, coaches, trains, planes, naval means or vehicles in general, fit also to the head and neck protection of the transported people.

The known headrests are often height and tilting adjustable in order to be fit for the different people builds and requirements.

Generally the known headrests are placed, or adjusted, at a certain distance from the head and for this reason they have the drawback of not providing a sufficient protection from the damages caused by the fast retrograde motion of the trunk and the head, known as whiplash, following from a collision or an accident.

There are also known vehicle seats provided with backs having mechanisms connected to the headrests in order to cause the forward motion thereof thanks to the force exerted by the people back onto the seat back.

Said headrests activated by the force impressed by the users to the seat backs, have the drawback of being extremely complex, expensive, and hard to restore in the correct working condition after the activation.

There are known headrest, actually in testing step, provided with, or associated to cushions, known as air-bag, inflated by pyrotechnic devices activated by electronic controls connected to sensors for the sensing of the accelerations following from collisions.

Said under testing known air-bags have, in addiction to the drawbacks of being complex, expensive, low-reliable in hard environmental conditions, having electronically activated pyrotechnic devices hard to restore, the drawback to be very difficult of being set and calibrated for proper activation time and conditions.

DISCLOSURE OF THE INVENTION

The main object of the present invention is to propose an active headrest device, for a vehicle and fit to provide efficient protection of cervical vertebra against the effects of the vehicles collisions.

Another object is to propose a simple, lightweight, economic and reliable device.

Another object is to propose a device that, after one or more activations, is simple to be restored in a working condition by means of a simple manual intervention.

A further object is to propose a device usable both in new and actual devices.

Another object is to propose a device which may be activated in case of forward or backward directions stresses or following from accelerations having a longitudinal component, in respect to the vehicle, bigger to a predefined threshold and directed frontally or from the back.

Another object is to propose a device which may be coupled to known protection devices and headrests.

BRIEF DESCRIPTION OF THE DRAWINGS

The characteristics of the invention are underlined in the following with particular reference with the attached drawings, in which.

BEST MODE OF CARRYING OUT THE INVENTION

Referring to FIGS. 1-8, the numeral 1 indicates the active headrest device for vehicle, object of the present invention, provided with a headrest portion 2 which has a section shaped almost like a cave and turned upside down "U".

In an active condition A, the device is ready to work in order to reduce the distance between the headrest portion 2 and the user head as a consequence of a proper stress from which it follows that the device, after having carried out said distance reduction, is in an inactive condition I in which the headrest portion 2 is in an extreme front position.

The headrest portion may consist, for instance, in an armour made of plastic material almost shaped as a folded slab in order to assume the shape of the "U" section and externally provided with a padding for the head.

The front part of the headrest portion 2 may protrudes slightly forward. The side ends of the internal cavity of the headrest portion 2 may be occluded by respective caps or diaphragms in order to hide the content thereof.

The headrest portion 2 is supported by at least a support member 4 consisting in an elongated element, as an example of a metallic tubular type, folded as a turned upside down "U" which forms two parallel and elongated stems jointed in the upper part by an end upper portion 10 perpendicular to said stems.

The lower portions of the two stems of the support member are fit to the connection to a seat back of the vehicle.

The end upper portion 10 is connected in a rotating manner to one or more housing means 9, of rotating means 3, blocked in the inner cavity of the headrest portion 2.

Said housing means 9 of the rotating means 3 are fit to allow the headrest portion 2 to swing between the extreme front position to an extreme back position in respect to the vehicle.

The rotating means 3 comprise at least an adjustable friction means 11 blocked into the inner cavity of the headrest portion 2 and fit to brake in an adjustable manner the respective rotation of the end upper portion 10, engaged therein.

The adjustable friction means 11 may comprise, for instance, a ribbon or jaw portion fixed to the headrest portion 2 and which may be clamped in an adjustable manner, by screw means.

The screw means may be activated by the inner part of the cavity by means of a tool or by means of a knob lateral and external to the headrest portion 2 in order to adjust the angular position thereof.

The adjustable friction means 11 is made in such a manner to avoid the complete blocking of the headrest portion 2 in such a way that a sufficient force is fit to rotate the headrest portion 2 without deformations or damages.

The device 1 comprises a pushing means 5 consisting in an elongated element, for instance of the metallic tubular type, turned upside down "U" shaped with the upper intermediate portion forming a matching sliding head 12.

Each end of the pushing means 5 is associated to a respective first elastic means 6 and is blocked, for instance by welding, to a respective first plate 13.

Each first plate 13 is connected in a rotating manner, through a respective first pin 14, to a correspondent second plate 15 blocked, for instance by welding, to a respective stem of the support member 4.

Each first elastic means 6 consists in a helicoidal metallic spring with the central portion wrapped around the respective first pin means 14 and with the ends engaged respectively in the pushing means 5 and in a relief of the second plate 15.

Said helicoidal springs connected to the ends of the pushing means transmit to the latter an elastic rotating torque towards the front direction.

One of the two first plates 13, the left one in figures, and then also the pushing means 5, may reversibly block the pushing means 5 in an active condition A.

Alternatively the invention provides that the blocking arm may be provided with the recess and that the first plate is provided with the protrusion.

Each second pin 16 is connected to the medial portion of the respective blocking arm 7 which thus may swing, like a rocker lever, between two extreme positions.

Each blocking arm 7 is plane and elongated shaped and extends perpendicularly to the respective second pin 16.

The first 13 and second 15 plates are mutually parallel and parallel to the direction between the extreme back and front positions of the headrest portion 2 and the first 14 and second 16 pins are mutually parallel and perpendicular to said direction.

The inner cavity of the headrest portion 2 contains at least the upper portion of each support means 4, each pushing means 5, each first elastic means 6, each blocking means 7 and the inertial mass 8.

In the active condition A, in which the device is ready to work, the blocking arm 7 blocks reversibly the respective first plate 13 of the pushing means 5 maintaining it in a retracted condition, with the device in a active condition A, allowing the headrest portion 2 to swing between the extreme front and back portions.

In said active condition A the helicoidal springs of the two first elastic means 6, are at the maximum flexion degree and, as seen, transmit to the pushing means 5 elastic forces directed forwardly, that is in the extreme front position of the headrest portion 2.

The blocking arm 7 and the respective first plate 13 are almost coplanar.

The inertial mass 8 has an elongated shape, as an example cylindrical shape, and each end of said mass is fixed to an end of the respective support arm 19 whose opposite end is connected in a rotating manner by means of the respective first pin 14 of the correspondent first 13 and second 15 plates and thus to the support means 4.

The end of each support arm 19 fixed to the inertial mass 8, has a longitudinal protrusion 20 having a side fit to match in a removable manner a relief 21 of the end of the correspondent blocking arm 7 opposite to the respective protrusion 44.

The blocking arm 7 has a protruding stop 25, interposed between the second pin 16 and the protrusion 44.

Said stopping means is pin shaped and fit to match in a removable and sliding manner a side of the respective support arm 19.

The side of the longitudinal protrusion 20 of the support arm 19 fit to match with a relief 21 of the blocking arm 7, is opposite to the side of the longitudinal protrusion 20 fit to match with the stopping means 25 of the blocking arm 7.

Said configuration allows to the mass 8 to release the pushing means 5 and thus put the headrest in the advanced position, in both the front and back stress cases.

Actually, in the case the vehicles, into which the device is installed, crashes against an front obstacle, the inertial mass causes the forwardly rotation of the support arm 19 whose longitudinal protrusion 20, acting onto the relief 21 of the blocking arm 7 causes the rotation thereof with a consequent coming out of the protrusion 44 from the first recess 43 and unblocking of the pushing means 5.

In case the vehicle is subject to a back collision by means of another vehicle, the inertial mass causes the backwards rotation of the support arm 19 whose side opposite to the active one of the longitudinal protrusion 20, acting on the stopping means 25 of the blocking means 7 causes the rotation of the latter with the consequent coming out of the protrusion 44 from the first recess 43, and again unblocking of the pushing means 5.

Obviously the collision stress must be bigger to a threshold due to the frictions, to the force required to the blocking arm rotation and definable by means of the elastic force variation produced by a second and a third elastic means.

The second elastic means 46 is interconnected between the second plate 15 and the respective blocking arm 7 in order to transmit to the latter a force in the entry direction of the protrusion 44 in the first recess 43.

The third elastic means 47 is interconnected to the blocking arm 7 and the respective support arm 19 in order to transmit to them a force in the mutually approaching direction of the portions near to the first pin 14 and to the protrusion 44.

Each second 46 and third 47 elastic means has an end connected to the stopping means 25 protruding from the blocking arm 7.

Alternatively the invention provides that both the sides of the device are provided with blocking arms connected to the mass by means of support arms in order to provide a symmetrical stop and release, at both the sides of the support member 4.

Figure 1:
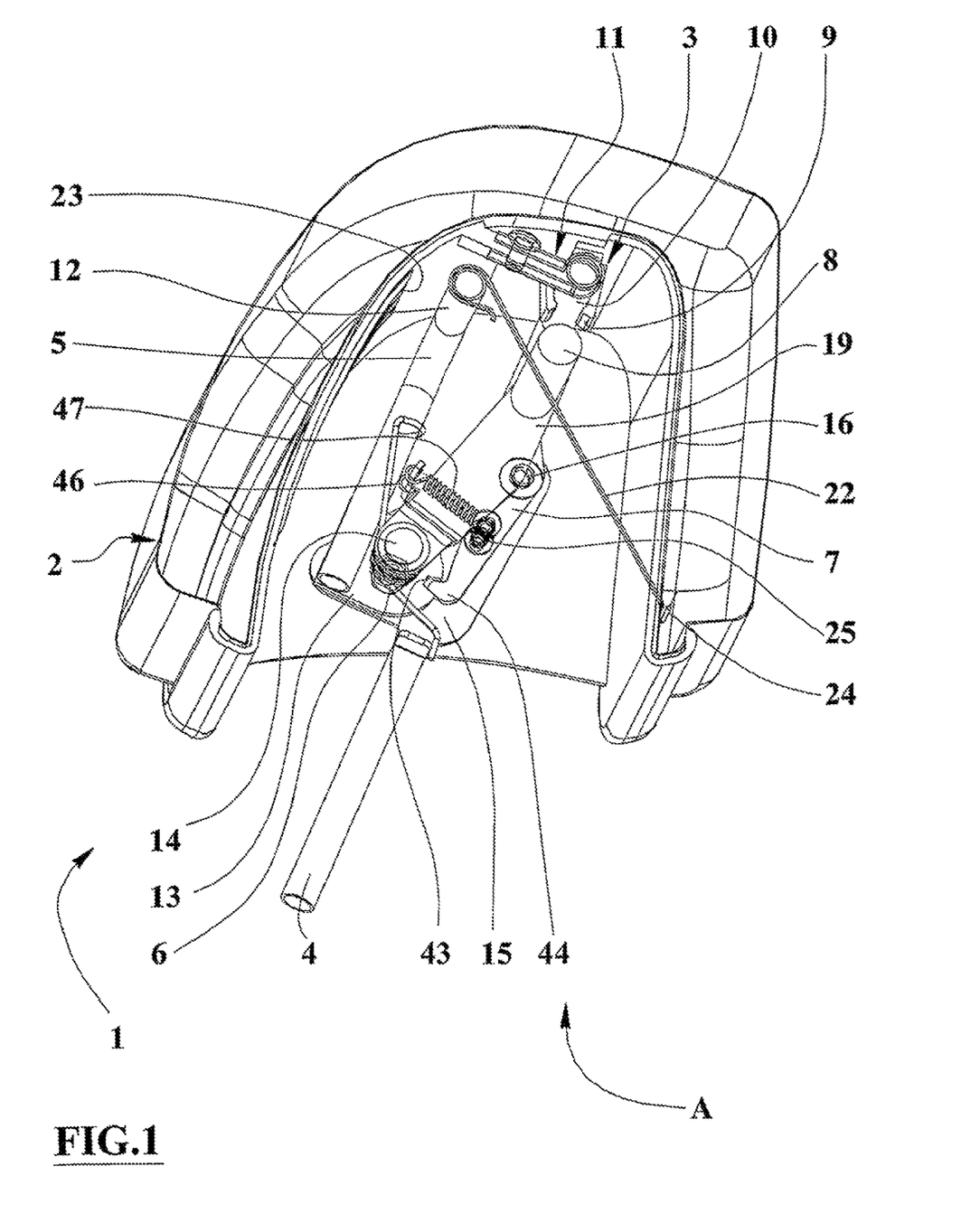
FIG. 1 shows an axonometric and section view of the active headrest device for a vehicle object of the present invention in an active condition and in which, for simplifying the illustration, some portions have been removed.
Figure 2:
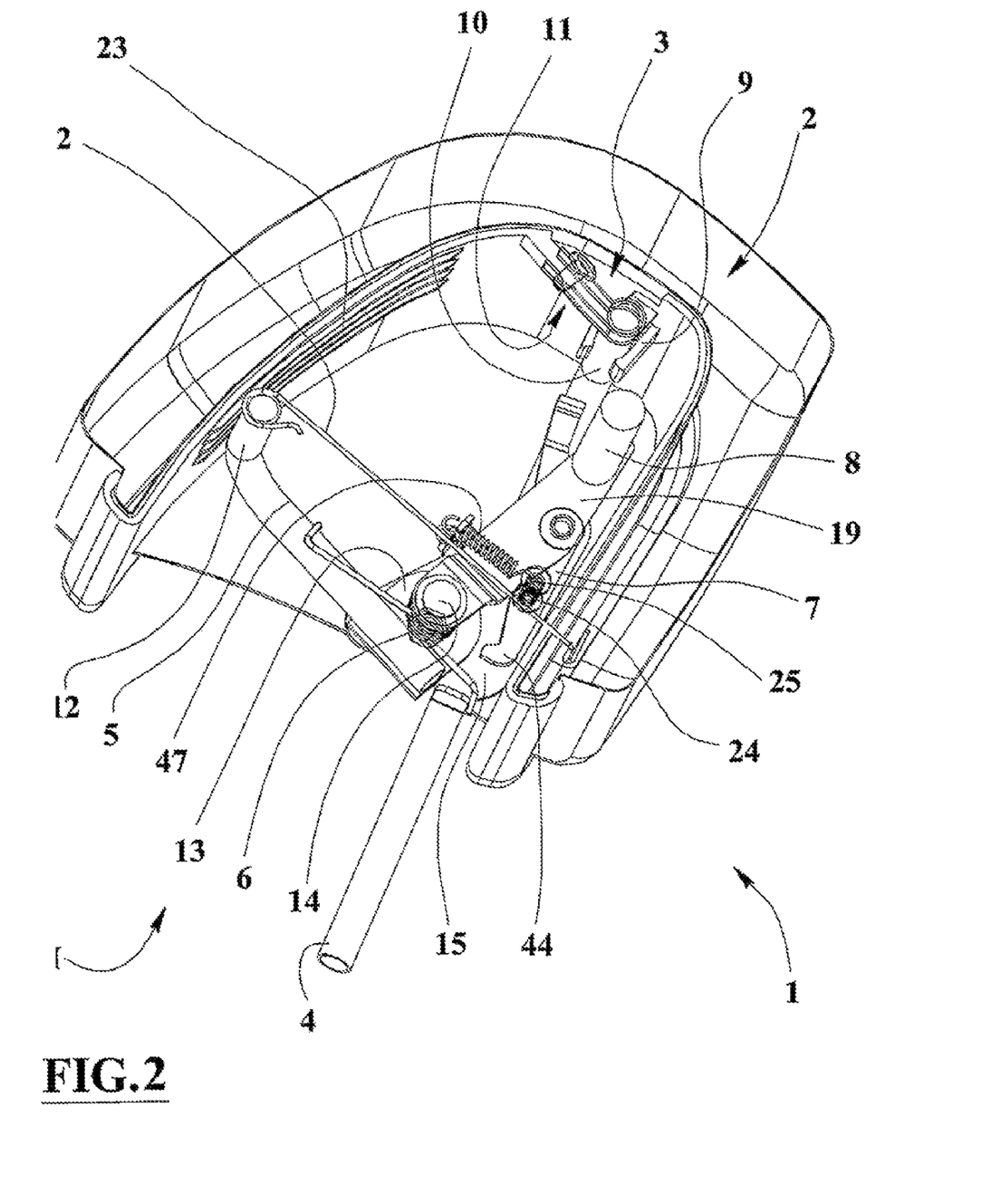
FIG. 2 shows an axonometric and section view of the device of FIG. 1, in an inactive condition, immediately successive to an activation.
Figure 3:
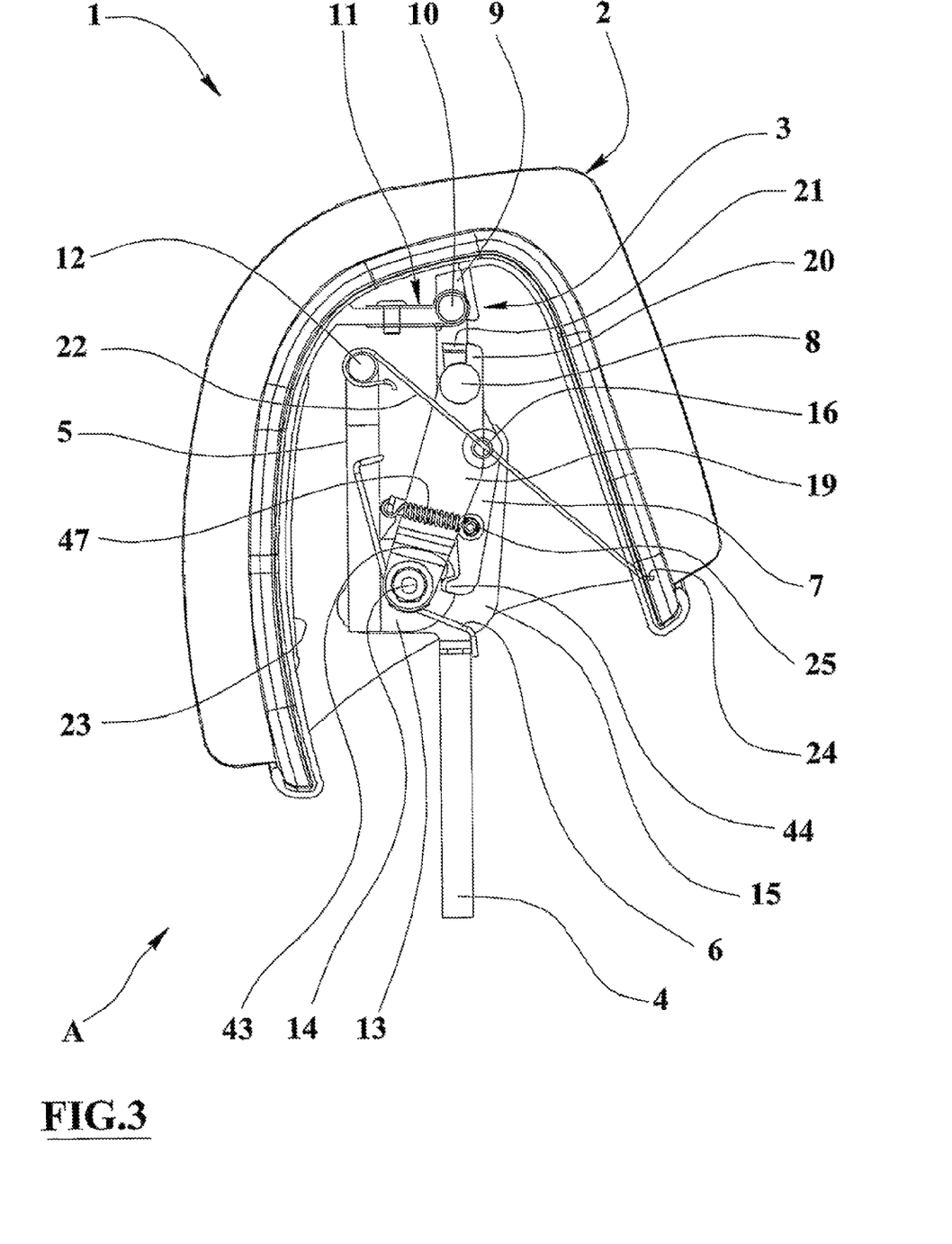
FIG. 3 shows a side section view of the device of FIG. 1 in the active condition.
Figure 4:
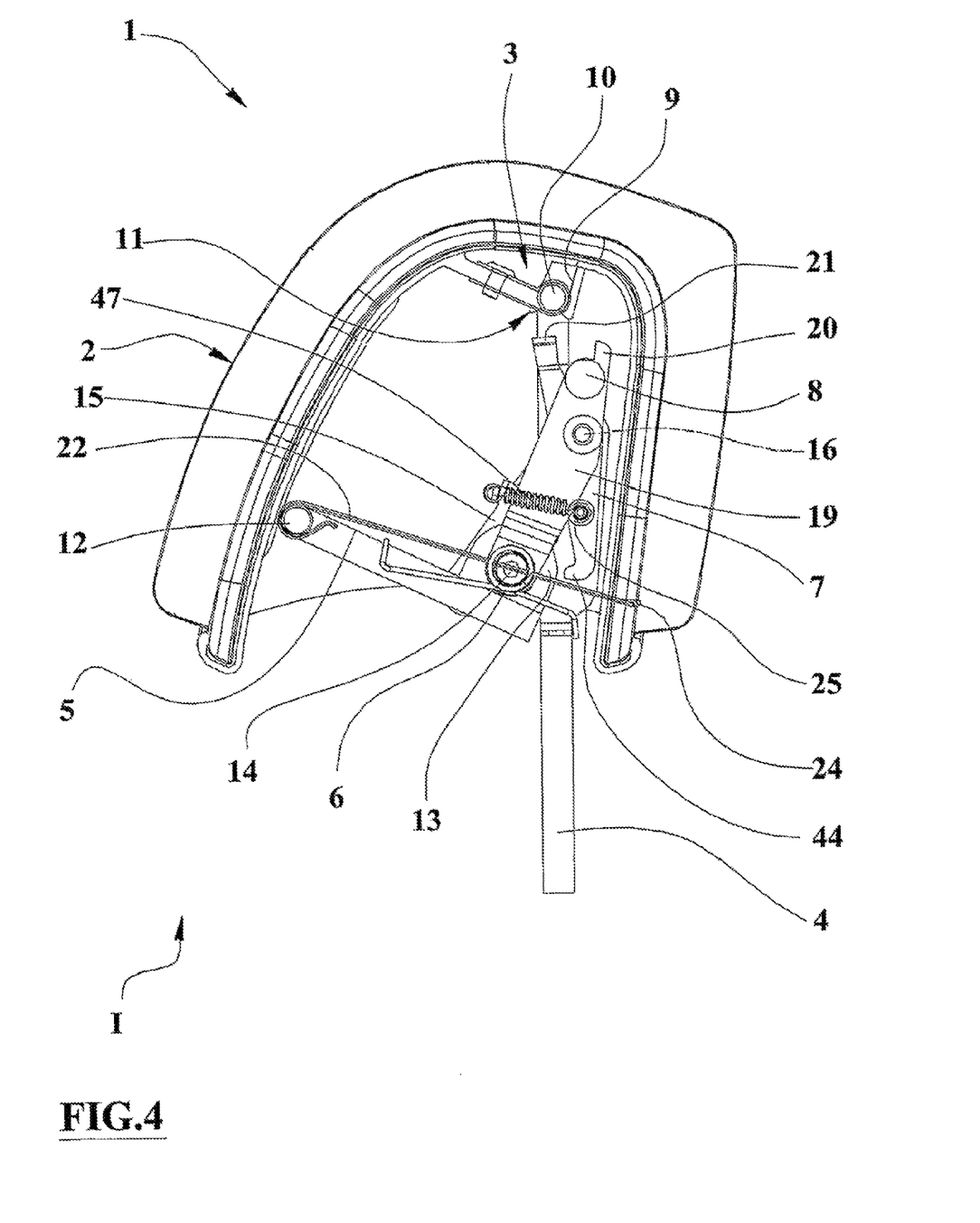
FIG. 4 shows a side section view of the device of FIG. 1 in the inactive condition.
Figure 5:
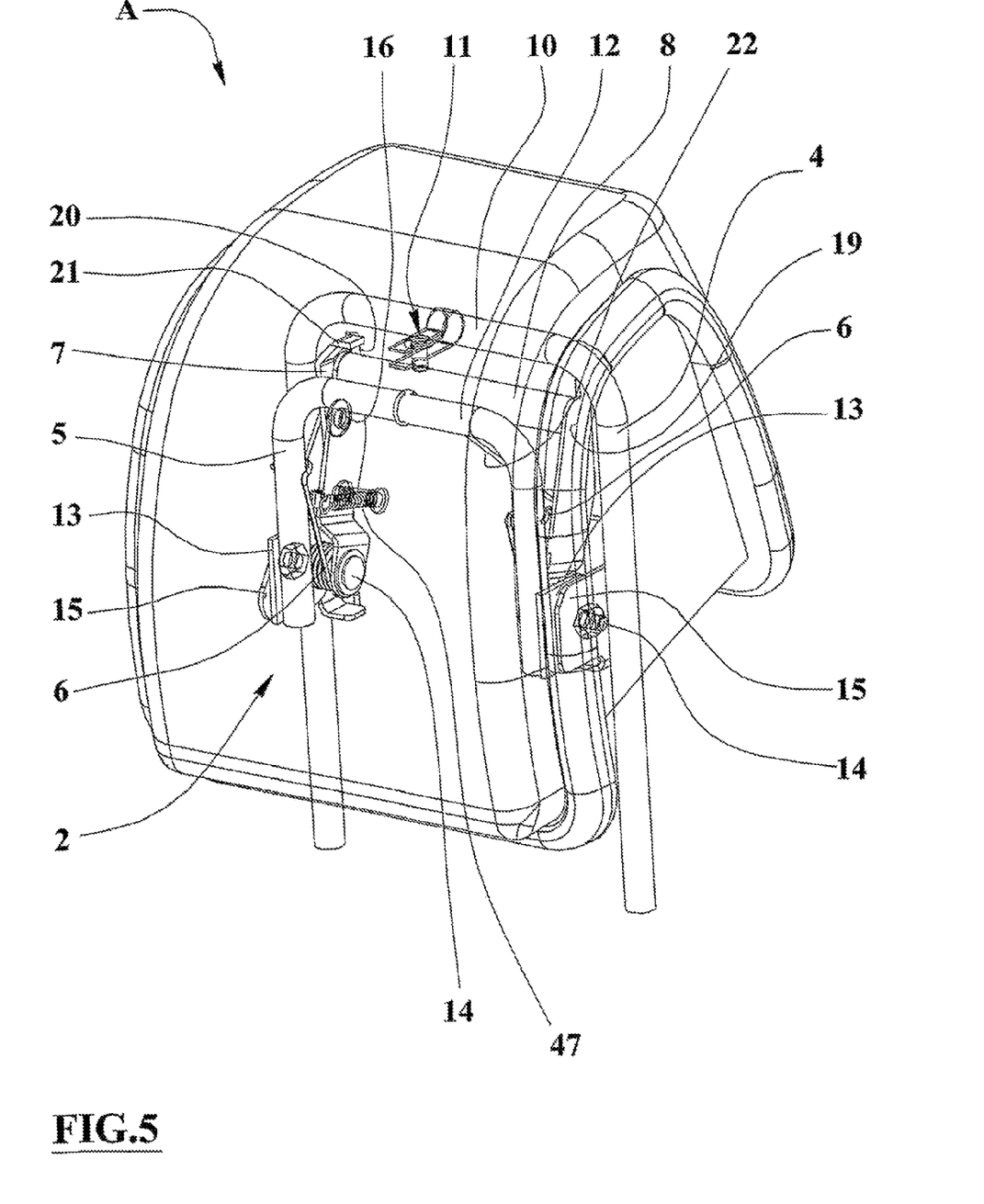
FIGS. 5 and 6 show a top, axonometric and in transparency views of the device of FIG. 1 respectively in active and inactive conditions and in which some portions have been removed for better highlighting other portions.
Figure 6:
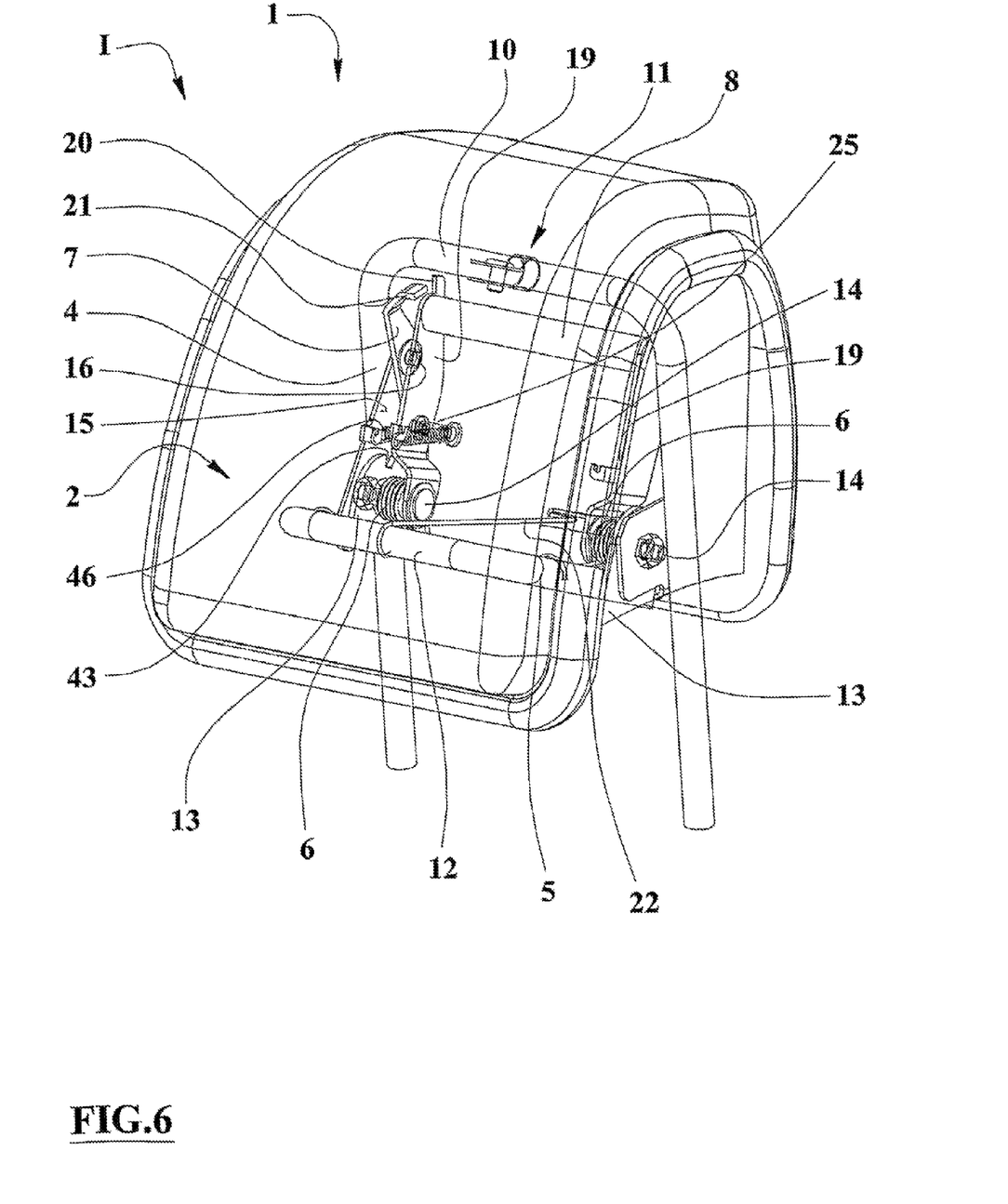
Figure 7:
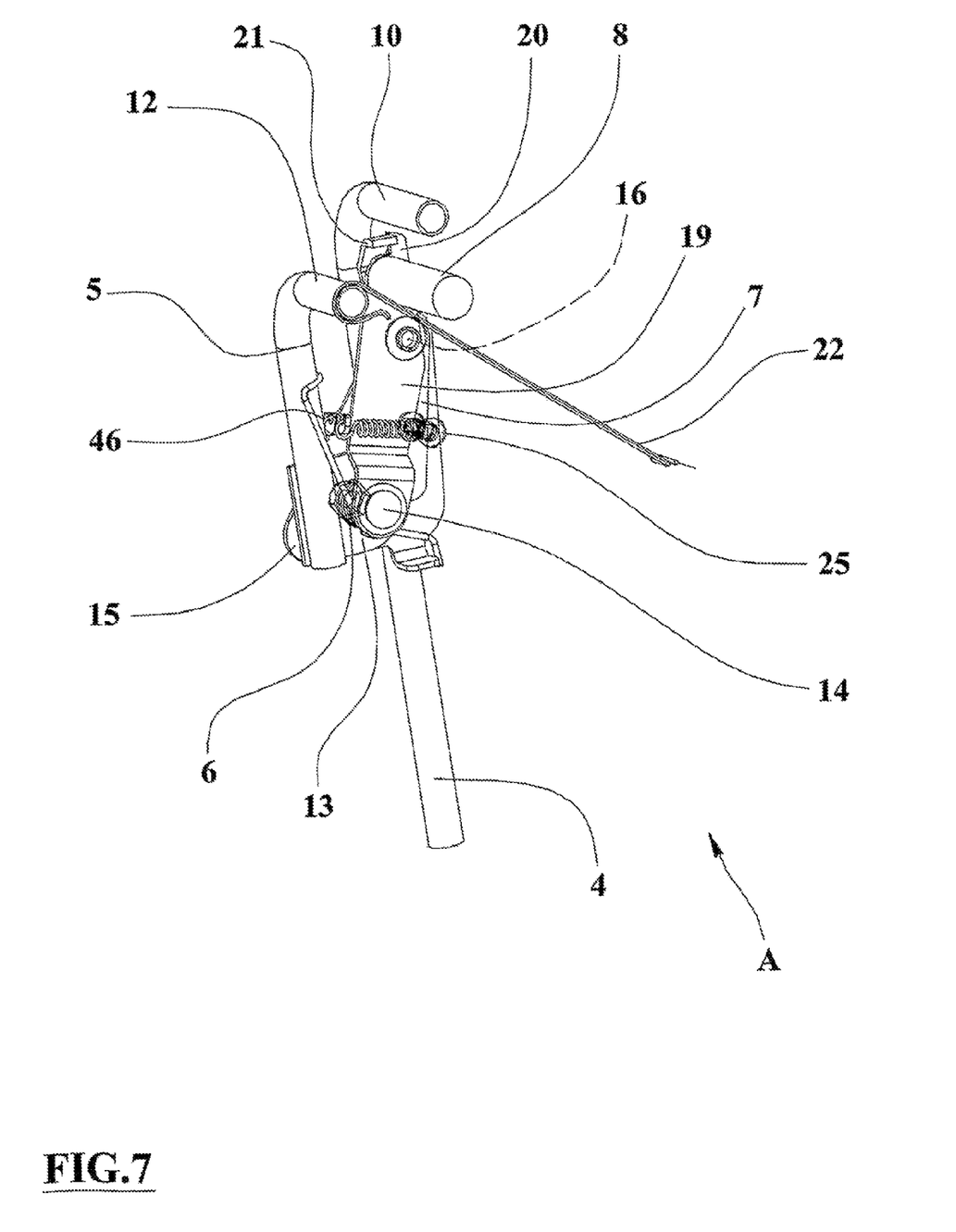
FIGS. 7 and 8 show axonometric views of a side portion of the mechanism of the device in the active and inactive condition.
Figure 8:
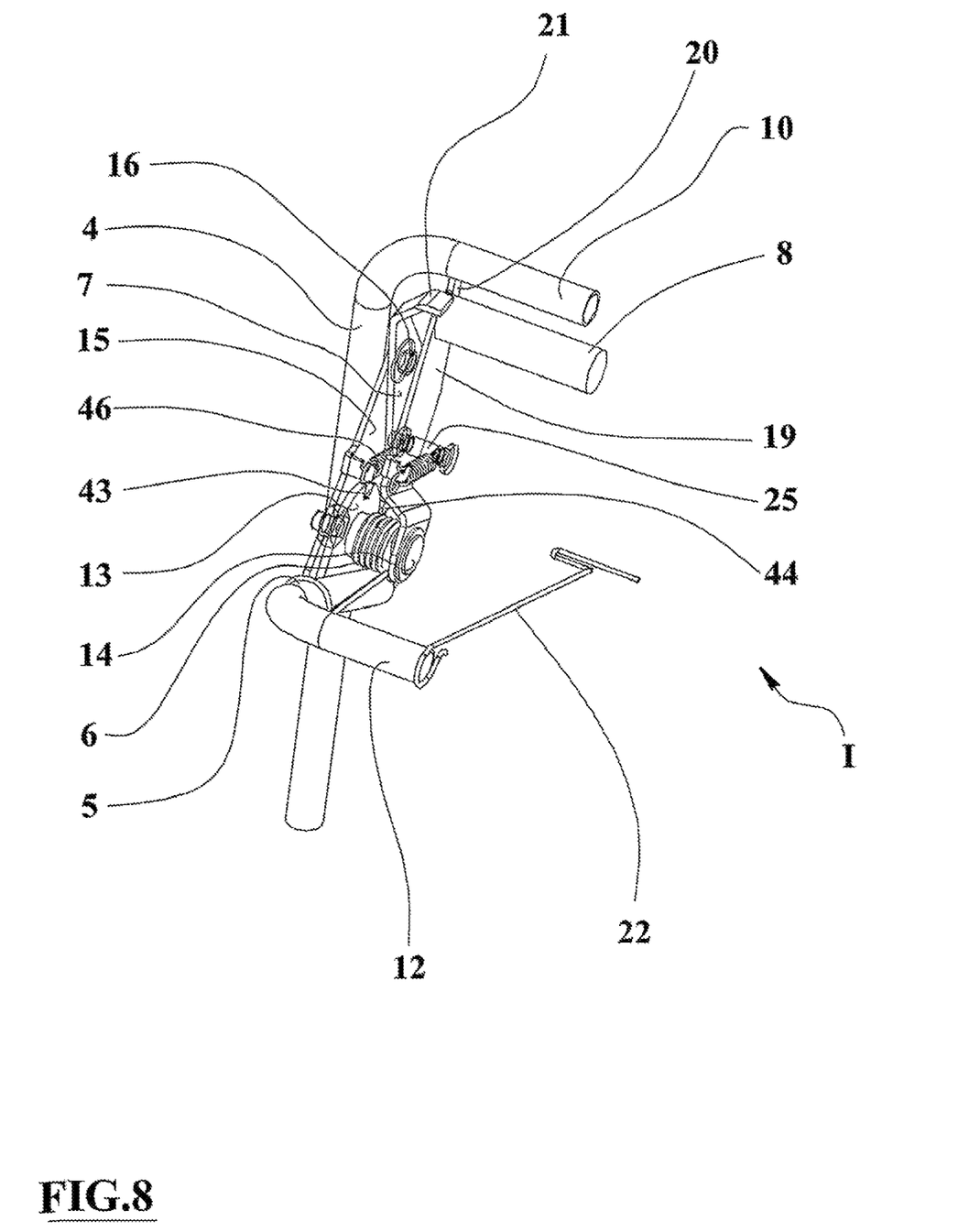

The front face of the inner cavity of the headrest portion 2 comprises a set of ribs 23, shown in FIG. 3, parallel to the respective motion direction between the headrest portion 2 and the sliding matching head 12.

Said ribs 23, in addicition to strengthen the headrest portion 2 reduce the sliding friction of the sliding matching head 12.

The device 1 comprises a tie-rod means 22, for instance a steel cable, whose ends are connected respectively to the pushing means 5 and to the part of the headrest portion 2 opposite to the part onto which acts the pushing means 5.

Particularly an end of the tie rod means 22 is fixed to the matching sliding head 12 and the other one to a respective connection 24 fixed to the inner and lower portion of the headrest portion 2 opposite to the part onto which the pushing means 5 acts.

The transversal sections of the elongated support members 4 and of the pushing means 5 are circularly shaped but, alternatively, the invention provides that they are oval or elliptically shaped.

The main axis of the transversal sections oval or elliptically shaped is oriented according to the inertial stress direction.

Figure 9:
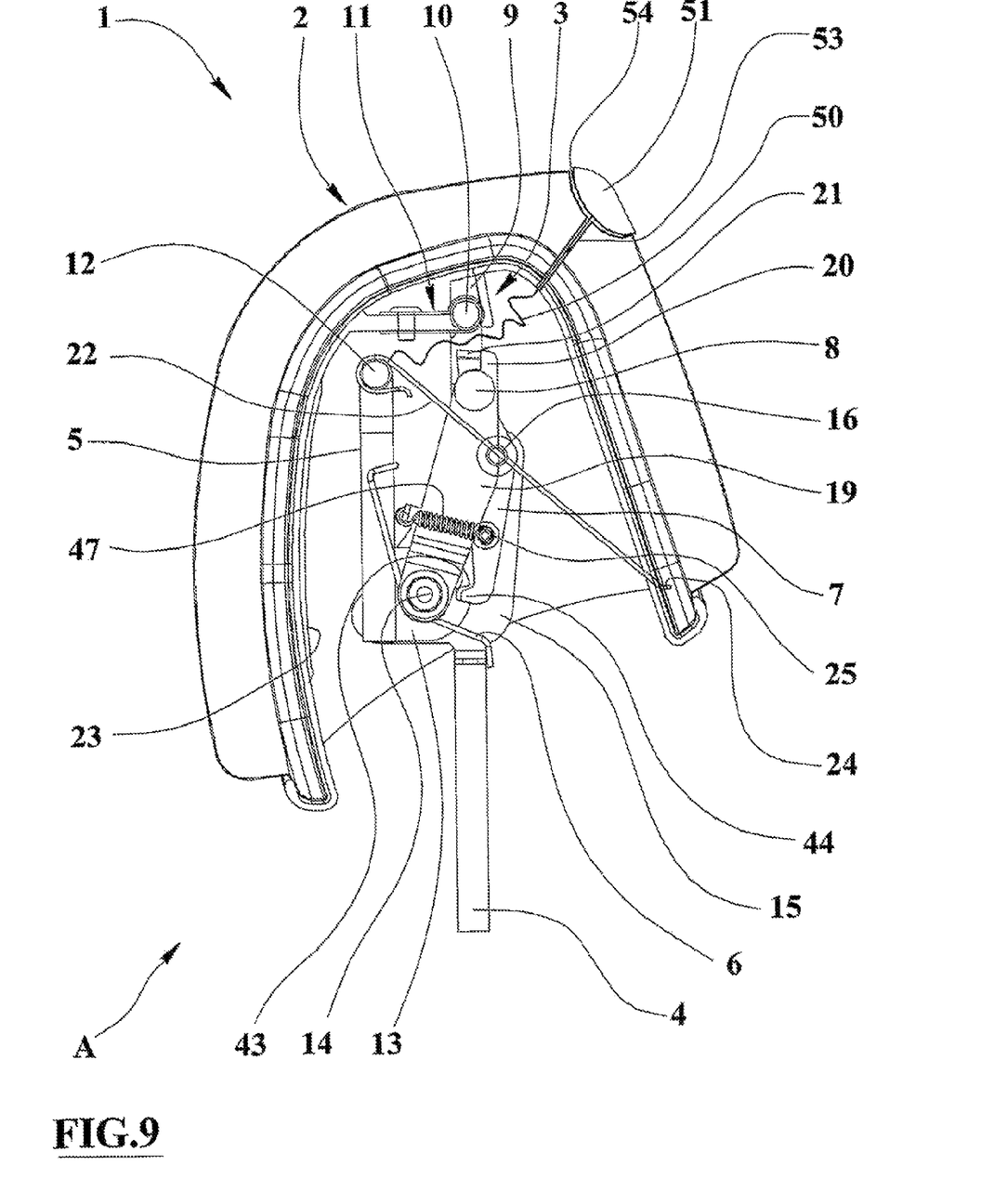
FIG. 9 shows a side section view of a first variant of the device of FIG. 1 in the active condition.
Figure 10:
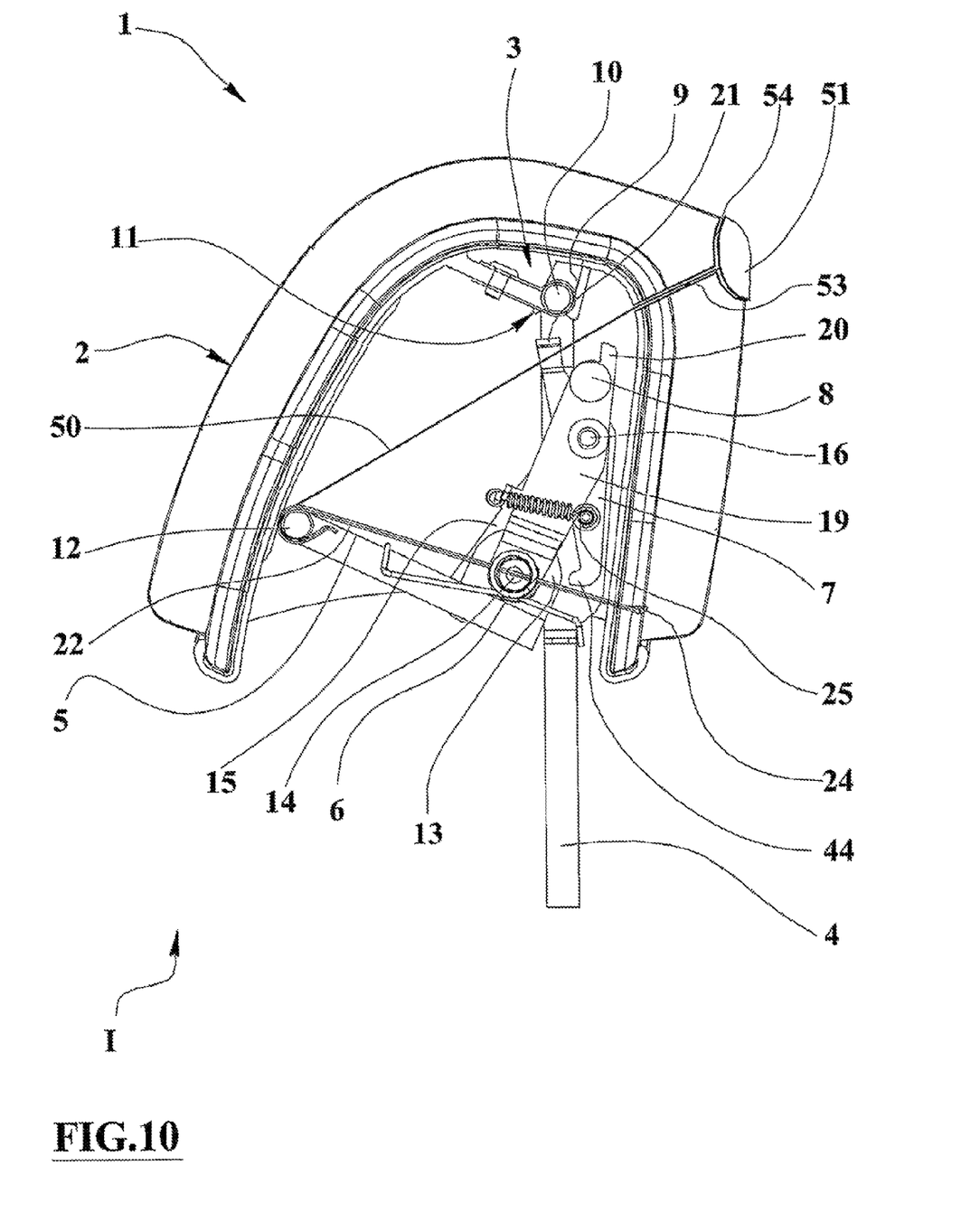
FIG. 10 shows a side section view of the variant of FIG. 9 in the inactive condition.

In the first variant of FIGS. 9 and 10 the matching head 12 of the pushing means 5 is connected to a flexible means 50, like a thread or a rope, having an end fixed to a removable handle 51 housed in a removable manner in a housing 54 placed in the upper part of the headrest portion 2.

The headrest portion comprises a passing 54 fit to house a flexible means 50 and reaching the housing 54.

The movably handle 51 is fixed in a removable manner to the headrest portion 2 by fixing means, not shown, of the Velcro type or similar.

In this way the movable handle 51 extraction from the inner housing of the headrest portion 2 allows the passing from the inactive condition I, shown in FIG. 10, to the active condition A, shown in FIG. 9.

Figure 11:
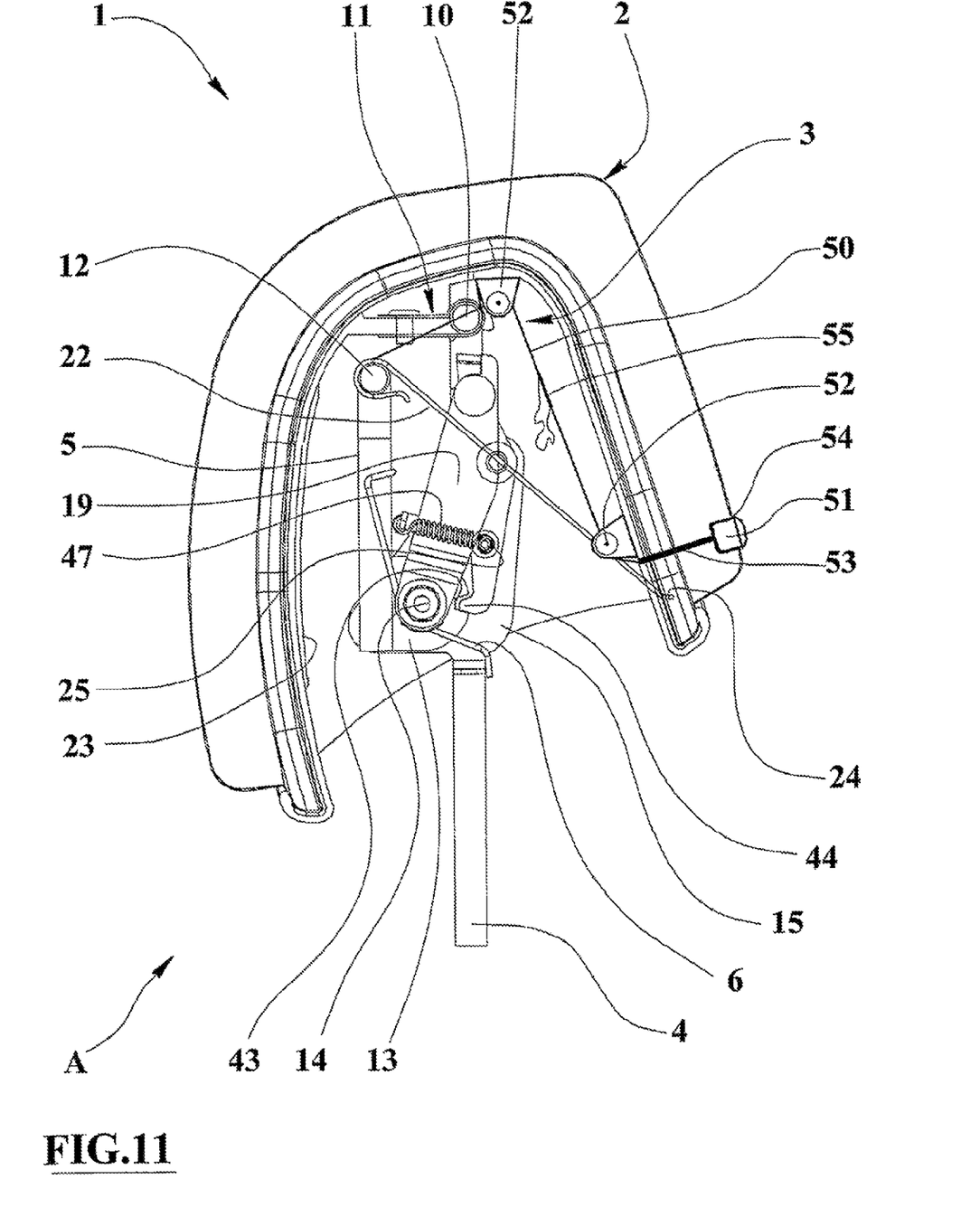
FIG. 11 shows a side section view of a second variant of FIG. 1 in the active condition.
Figure 12:
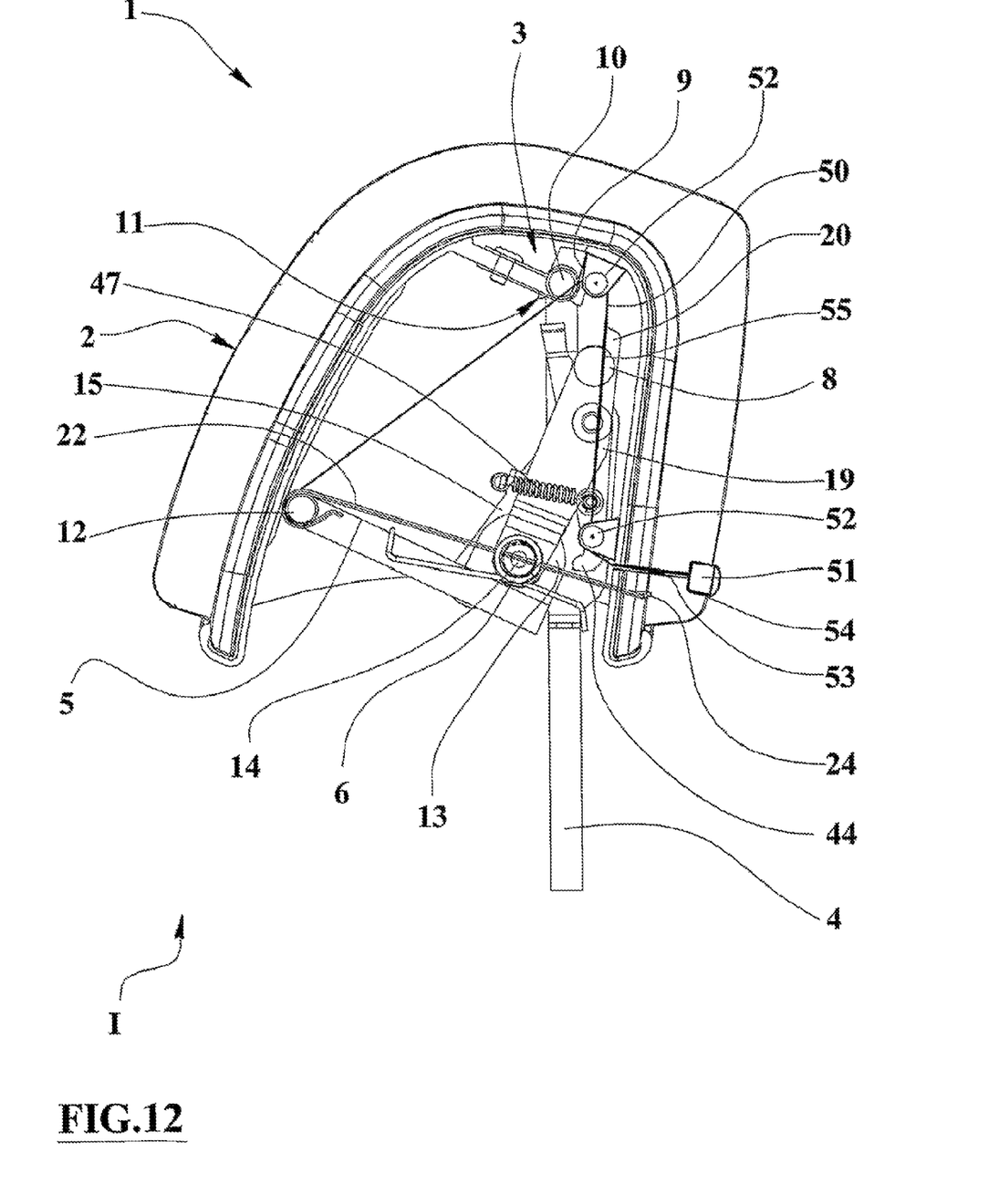
FIG. 12 shows a side section view of the second variant of FIG. 11 in the inactive condition.

In the second variant of FIGS. 11 and 12 the movable handle 51 is housed in the lower part of the headrest portion 2 in such a way to be manually removed.

The flexible means 50 is provided with a tensioning elastic means 55 of the flexible means 50 in the active condition A and is engaged in the guiding means 52 which comprise a first pulley fixed in the upper part of the inner cavity of the headrest portion 2, and a second pulley fixed in the lower part of said cavity.

Said pulleys are of the anti-slipping off type in such a way to avoid that the flexible means 50 exits from its sliding housing.

Figure 13:
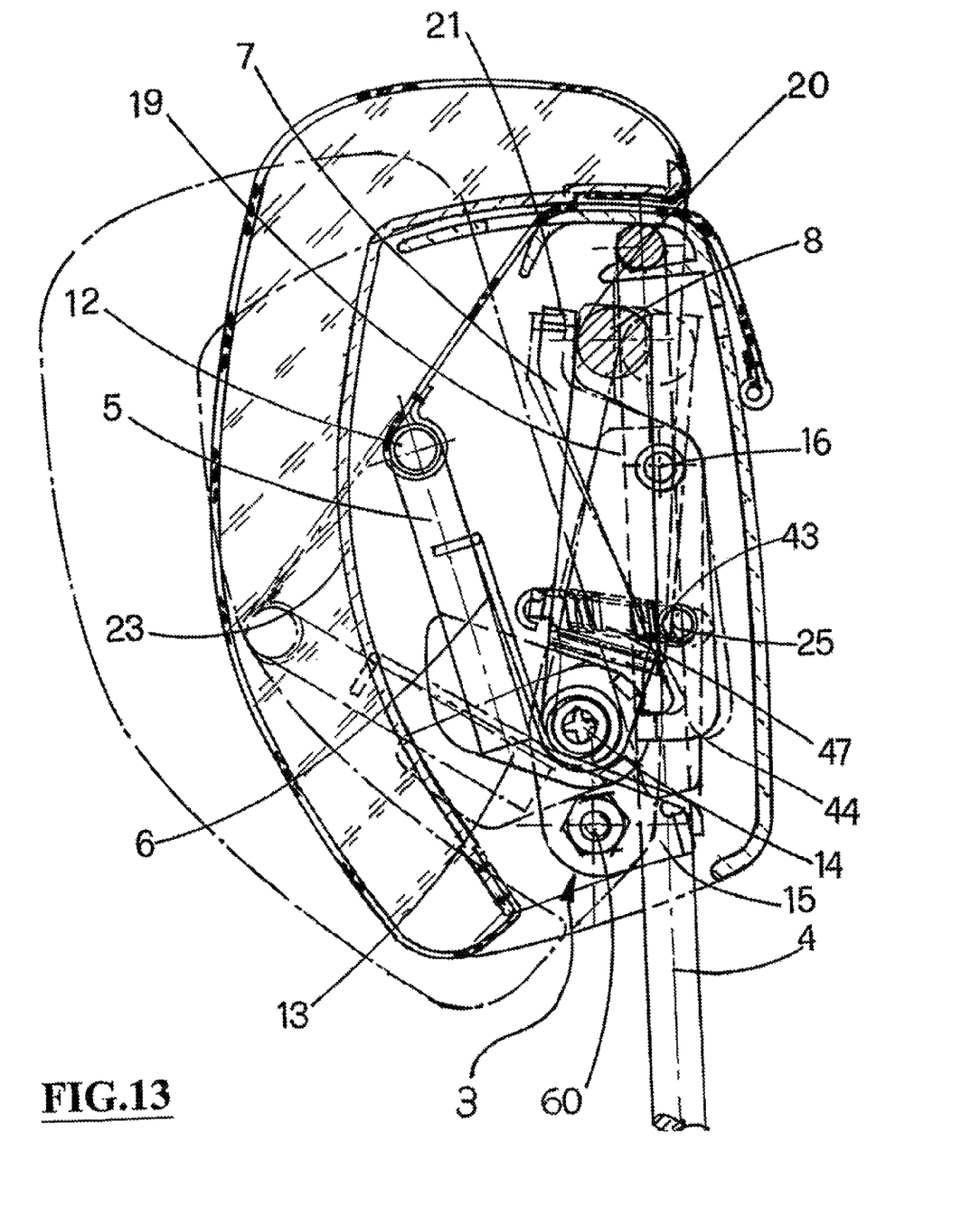
FIG. 13 shows a side section view of a third variant of the device of FIG. 1, in which the continuous line shows the active condition while the broken line shows the device in the inactive condition.

In the third variant of FIG. 13 the rotating means 3 comprise at least a connection pin 60 for the rotating connection between the support member 4 and the headrest portion 2.

Said pin 60 is placed in the lower portion of the inner cavity of the headrest portion 2 and is fit to the rotation thereof in respect to the support means 4. The connection pin 60 is connected to the support member 4 below the first pin 14.

Another variant of the device, whose understanding does not require specific figures, comprises a sole support member 4 provided with a respective stem, bar or column for a respective first plate 13 and a sole second plate 15 connected to a pushing means 5 consisting in a sole elongated element and to a sole blocking arm 7 for a sole inertial mass 8.

A further variant of the device, whose understanding does not require specific figures, comprises two support members 4 each of them provided with a respective stem, bar or column for a respective first plate 13 and a respective second plate 15 connected to a respective pushing means 5 consisting in a sole elongated element and to a respective blocking arm 7 for a respective inertial mass 8.

Another variant of the device, whose understanding does not require specific figures, comprises a sensor means, for instance a switch or a Hall effect device, associated to the pushing means 5 or the blocking arm 7 or the inertial mass 8 or similar, and connected to control means of the vehicle to provide said control means with signals of the device activation.

An advantage of the present invention is to provide an active headrest device, for a vehicle and fit to provide efficient protection of cervical vertebra against the effects of the vehicles collisions.

Another advantage is to provide a simple, lightweight, economic and reliable device.

Another advantage is to provide a device that, after one or more activations, is simple to be restored in a working condition by means of a simple manual intervention.

A further advantage is to provide a device usable both in new and actual devices.

Another advantage is to provide a device which may be activated in case of direction or opposite to the direction stresses or following from accelerations, having a longitudinal component, in respect to the vehicle, bigger to a predefined threshold and directed frontally or from the back.

Another advantage is to provide a device which may be coupled to known protection devices and headrests.

The invention claimed is:

1. An active headrest device for a vehicle comprising:
 a headrest portion (2) rotatably mounted, through rotation means (3), to a support member (4) in order to allow the headrest portion (2) to swing between an extreme front position and an extreme back position in respect to the vehicle;
 pushing means (5) engaged by first elastic means (6) which may be blocked or released by a swinging blocking arm (7) connected to an inertial mass (8);
 wherein in an active condition (A), the blocking arm (7) blocks the pushing means (5) in a retracted condition allowing the headrest portion (2) to swing between the extreme front position and the extreme back position, and in which the first elastic means (6) transmits to the pushing means (5) an elastic force directed in the direction of the extreme front position of the headrest portion (2), the inertial mass (8), when subjected to a stress larger than a predefined threshold in a front or back direction, causing a rotation of the blocking arm (7) which releases the pushing means (5) which, as a result of the elastic force of the first elastic means (6), rotates and/or stops the headrest portion (2) in the extreme front position;
 the headrest portion (2) being shaped in section substantially as an upside down "U" and containing in an inner cavity an upper portion of the support member (4), the pushing means (5), the first elastic means (6), the blocking arm (7) and the inertial mass (8);
 a lower portion of the support member (4) being mountable to a seat back; and,
 wherein the rotating means (3) has housing means (9) fixed in an upper part of the inner cavity of the headrest portion (2), an upper end portion (10) of the support member (4) being engaged in a rotating manner in said housing means (9);
 the rotating means (3) having adjustable friction means (11) fixed in the inner cavity of the headrest portion (2), for adjustably braking the rotation of the upper end portion (10).

2. The device according to claim 1 wherein the pushing means (5) has a sliding head (12) for sliding along a front face of the inner cavity of the headrest portion (2) in order to stop the headrest portion in the front position;

the front face of the inner cavity of the headrest portion (2) having a set of ribs (23) for guiding the sliding head (12);
the pushing means (5) having an opposite end rotatably connected to the support member (4);
said opposite end being fixed to a first plate (13) which is rotatably connected through a first pin (14) to a second plate (15) fixed to the support member (4);
the first elastic means (6) being a metallic helicoidal spring having a first end engaged to the pushing means (5) and a second end engaged to the second plate (15) or to the support member (4);
second elastic means (46) interconnected between the second plate (15) and the blocking arm (7) in order to transmit to the blocking arm a force for directing a protrusion (44) extending from the blocking arm into engaging a first recess (43) located in the first plate.

3. The device according to claim 2 further comprising third elastic means (47) interconnected between the support arm (19) and the blocking arm (7) in order to bias portions thereof in a direction where the protrusion (44) approaches near to the first pin (14) for the manual reset thereof;
each of the second elastic means (46) and the third elastic means having an end connected to the protruding stopping means (25) of the blocking arm (7).

4. The device according to claim 2 further comprising a tie-rod having a first end connected to the pushing means (5) and a second end connected to a part of the headrest portion (2) located opposite to a part upon which the pushing means (5) acts, being an inner and lower part of the headrest portion (2) opposite to the part of the headrest portion on which the pushing means (5) act, the first end of the tie-rod being fixed to a sliding head (12).

5. The device according to claim 2 wherein the protrusion (44) removably engages the first recess (43) in order to block reversibly the pushing means (5)in the active condition (A);
the blocking arm being rotatably connected to the support member (4) through a second pin (16) which provides a rotational connection for the second plate (15); the second pin being connected to a medial portion of the blocking arm (7);
the first plate (13) and second plate (15) being parallel to each other and parallel to a direction of movement of the headrest portion, moving between the extreme front position and the extreme back position, the first pin (14) and the second pin (16) being mutually parallel and perpendicular to said movement direction.

6. The device according to claim 5 wherein the support arm (19) is connected to the support member (4) through the first pin (14) of the first (13) and second (15) plates;
an end of the support arm (19) being fixed to the inertial mass (8), the support arm end having a longitudinal protrusion (20) which removably engages a relief (21) provided in the blocking arm (7) opposite to the protrusion (44).

7. The device according to claim 6 wherein the blocking arm (7) has a protruding stopping means (25), interposed between the second pin (16) and a protrusion (44), the protruding stopping means removably engaging a side of the support arm (19);
the support arm (19) having a side including a longitudinal protrusion (20) which is matable with a relief (21) formed in the blocking arm (7), which is opposite to the side of the support arm which engages with the protruding stopping means (25) of the blocking arm (7).

8. The device according to claim 7 further comprising third elastic means (47) interconnected between the support arm (19) and the blocking arm (7) in order to bias portions thereof in a direction where the protrusion (44) approaches near to the first pin (14) for the manual reset thereof;
each of the second elastic means (46) and the third elastic means having an end connected to the protruding stopping means (25) of the blocking arm (7).

9. The device according to claim 5 wherein the blocking arm (7) has a protruding stopping means (25), interposed between the second pin (16) and a protrusion (44), the protruding stopping means removably engaging a side of the support arm (19);
the support arm (19) having a side including a longitudinal protrusion (20) which is matable with a relief (21) formed in the blocking arm (7), which is opposite to the side of the support arm which engages with the protruding stopping means (25) of the blocking arm (7).

10. The device according to claim 5 further comprising third elastic means (47) interconnected between the support arm (19) and the blocking arm (7) in order to bias portions thereof in a direction where the protrusion (44) approaches near to the first pin (14) for the manual reset thereof;
each of the second elastic means (46) and the third elastic means having an end connected to the protruding stopping means (25) of the blocking arm (7).

11. The device according to claim 5 wherein the blocking arm (7) extends almost perpendicularly to the second pin (16), and wherein the first plate (13) and the blocking arm (7) are almost coplanar;
the metallic helicoidal spring being wrapped around the first pin (14).

12. The device according to claim 1 wherein the inertial mass (8) is fixed to an end of a support arm (19), an opposite end of the support arm being rotatably connected to the support member (4);
the support member (4) being an upside down "U" shaped elongated planar element having two parallel and elongated stems superiorly jointed by an end upper portion (10) perpendicular to said two stems and engaged in the rotating means (3);
each stem having a first plate (13) and a second plate (15);
the two first plates (13) being connected to two ends of the pushing means (5), the pushing means formed by an elongate upside down "U" shaped element having an intermediate upper portion which forms the sliding head (12);
one of the second plates (15) being hinged to the blocking arm (7) and to the support arm (19);
transversal sections of the elongated planar element of the support member (4) and of the elongated planar element of the pushing means (5) being circular, oval or elliptically shaped and having a main axis oriented along an inertial stress direction.

13. The device according to claim 12 wherein the support arm (19) is connected to the support member (4) through the first pin (14) of the first (13) and second (15) plates;
an end of the support arm (19) being fixed to the inertial mass (8), the support arm end having a longitudinal protrusion (20) which removably engages a relief (21) provided in the blocking arm (7) opposite to the protrusion (44).

14. The device according to claim 12 further comprising third elastic means (47) interconnected between the support arm (19) and the blocking arm (7) in order to bias portions thereof in a direction where the protrusion (44) approaches near to the first pin (14) for the manual reset thereof;
each of the second elastic means (46) and the third elastic means having an end connected to the protruding stopping means (25) of the blocking arm (7).

15. An active headrest device for a vehicle comprising:
a headrest portion (2) rotatably mounted, through rotation means (3), to a support member (4) in order to allow the headrest portion (2) to swing between an extreme front position and an extreme back position in respect to the vehicle;
a pushing means (5) engaged by a first elastic means (6) which may be blocked or released by a swinging blocking arm (7) connected to an inertial mass (8);
wherein in an active condition (A), the blocking arm (7) holds the pushing means (5) in a retracted condition allowing the headrest portion (2) to swing between the extreme front position and the extreme back position, and in which the first elastic means (6) transmits to the pushing means (5) an elastic force directed in the direction of the extreme front position of the headrest portion (2), the inertial mass (8), when subjected to a stress larger than a predefined threshold in a front or back direction, causing a rotation of the blocking arm (7) which releases the pushing means (5) which, as a result of the elastic force of the first elastic means (6), rotates and/or stops the headrest portion (2) in the extreme front position;
the headrest portion (2) being shaped in section substantially as an upside down "U" and containing in an inner cavity an upper portion of the support member (4), the pushing means (5), the first elastic means (6), the blocking arm (7) and the inertial mass (8);
a lower portion of the support member (4) being mountable to a seat back; and,
a tie-rod (22) having a first end connected to the pushing means (5) and a second end connected to a part of the headrest portion (2) located opposite to an inner and lower part of the headrest portion upon which the pushing means (5) acts when in an inactive condition, the first end of the tie-rod being fixed to a sliding head (12) of the pushing means (5).

16. The device according to the claim 1 further comprising a second support member, each support member provided with a stem, bar or column for forming a pair of first plates 13, a pair of second plates (15) being connected to the pushing means (5).

17. An active headrest device for a vehicle comprising:
a headrest portion (2) rotatably mounted by rotation means (3) to a support member (4) in order to allow the headrest portion (2) to swing between an extreme front position and an extreme back position in respect to the vehicle;
pushing means (5), engaged by first elastic means (6), which may be blocked or released by a swinging blocking arm (7) connected to an inertial mass (8);
wherein in an active condition (A), the blocking arm (7) holds the pushing means (5) in a retracted condition allowing the headrest portion (2) to swing between the extreme front position and the extreme back position, and in which the first elastic means (6) transmits to the pushing means (5) an elastic force directed towards the extreme front position of the headrest portion (2), the inertial mass (8), when subjected to a stress larger than a predefined threshold in a front or back direction, causing a rotation of the blocking arm (7) which releases the pushing means (5) which, in response to the released elastic force of the first elastic means (6), rotates and/or stops the headrest portion (2) in the extreme front position;
the headrest portion (2) being shaped in section substantially as an upside down "U" and containing in an inner cavity at least an upper portion of the support member (4), the pushing means (5), the first elastic means (6), the blocking arm (7) and the inertial mass (8);
a lower portion of the support member (4) being attachable to a seat back; and
wherein the rotating means (3) include a connecting pin (60) for providing a rotating connection between the support member (4) and the headrest portion (2);
said pin (60) being placed in a lower part of the inner cavity of the headrest portion (2).

18. An active headrest device for a vehicle comprising:
a headrest portion (2) rotatably mounted through rotation means (3) to a support member (4) in order to allow the headrest portion (2) to swing between an extreme front position and an extreme back position in respect to the vehicle;
pushing means (5), engaged by first elastic means (6), which may be blocked or released by a swinging blocking arm (7) connected to an inertial mass (8);
wherein in an active condition (A), the blocking arm (7) holds the pushing means (5) in a retracted condition allowing the headrest portion (2) to swing between the extreme front position and the extreme back position, and in which the first elastic means (6) transmits to the pushing means (5) an elastic force directed towards the extreme front position of the headrest portion (2), the inertial mass (8), when subjected to a stress larger than a predefined threshold in a front or back direction, causing a rotation of the blocking arm (7) which releases the pushing means (5) which, in response to the released elastic force of the first elastic means (6), rotates and/or stops the headrest portion (2) in the extreme front position;
the headrest portion (2) being shaped in section substantially as an upside down "U" and containing in an inner cavity at least an upper portion of the support member (4), the pushing means (5), the first elastic means (6), the blocking arm (7) and the inertial mass (8);
a lower portion of the support member (4) being attachable to a seat back; and,
wherein the pushing means (5) are connected by a flexible means (50) to a movable handle (51) wherein manual activation of said movable handle (51) switches the device from an inactive condition (I) to the active condition (A);
the movable handle (51) being located in an upper wall of the headrest portion (2).

19. The device according to claim 18 further comprising elastic tensioning means (55) for tensioning the flexible means (50);
the movable handle (51) being movably mounted to the lower part of the headrest portion (2);
guiding means (52) for guiding the flexible means being fixed in the inner cavity of the headrest portion (2) and comprising a first pulley fixed superiorly to the inner cavity of the headrest portion (2), and a second pulley fixed in the lower part of said inner cavity;
the flexible means having a first end fixed to the movable handle (51) and a second end fixed to the pushing means (5);
the headrest portion (2) having a housing (54) for receiving the movable handle (51);
the housing having releasable fixing means for holding the movable handle therein;
the headrest portion (2) having a passage through which the flexible means extend, from the movable handle in the housing (54) to the pushing means (5).

20. The device of claim 1 further comprising sensor means for sensing device activation connected to control means of the vehicle to provide said control means with a signal of device activation.

* * * * *